(12) United States Patent
Kim et al.

(10) Patent No.: US 9,573,820 B2
(45) Date of Patent: Feb. 21, 2017

(54) METHOD FOR PREPARING POSITIVE ACTIVE MATERIAL FOR RECHARGEABLE LITHIUM BATTERY AND RECHARGEABLE LITHIUM BATTERY INCLUDING POSITIVE ACTIVE MATERIAL

(71) Applicant: SAMSUNG SDI CO., LTD., Yongin-si, Gyeonggi-do (KR)

(72) Inventors: Young-Ki Kim, Yongin-si (KR); Young-Hun Lee, Yongin-si (KR); Na-Leum Yoo, Yongin-si (KR); Na-Ri Park, Yongin-si (KR); Soon-Rewl Lee, Yongin-si (KR); Ick-Kyu Choi, Yongin-si (KR); Yong-Chul Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 267 days.

(21) Appl. No.: 14/183,437

(22) Filed: Feb. 18, 2014

(65) Prior Publication Data
US 2014/0295274 A1    Oct. 2, 2014

(30) Foreign Application Priority Data
Mar. 28, 2013  (KR) ........................ 10-2013-0033854

(51) Int. Cl.
*H01M 4/131* (2010.01)
*C01D 15/02* (2006.01)
(Continued)

(52) U.S. Cl.
CPC ............... *C01D 15/02* (2013.01); *B82Y 30/00* (2013.01); *C01G 53/42* (2013.01); *H01M 4/0402* (2013.01);
(Continued)

(58) Field of Classification Search
CPC ...................................................... H01M 4/131
(Continued)

(56) References Cited

U.S. PATENT DOCUMENTS

| | | | | |
|---|---|---|---|---|
| 6,423,453 B1 * | 7/2002 | Noda | ..................... | H01M 4/525 429/231.95 |
| 2002/0192148 A1 | 12/2002 | Kweon et al. | | |

(Continued)

FOREIGN PATENT DOCUMENTS

| | | |
|---|---|---|
| JP | 2005-129492 A | 5/2005 |
| JP | 2007-258095 A | 10/2007 |

(Continued)

OTHER PUBLICATIONS

EPO Search Report dated Jul. 28, 2014, for corresponding European Patent application 14160273.0, (6 pages).

(Continued)

*Primary Examiner* — Basia Ridley
*Assistant Examiner* — James Erwin
(74) *Attorney, Agent, or Firm* — Lewis Roca Rothgerber Christie LLP (57) ABSTRACT

A rechargeable lithium battery includes a non-aqueous electrolyte, a negative electrode including a silicon-based negative active material, and a positive active material including a compound represented by a Chemical Formula 1, $Li_{1+x}Co_{1-y}M_yO_2$, wherein, $-0.2 \leq x \leq 0.2$, $0 < y \leq 0.2$, and M includes Ni and one selected from Mn, B, Mg, Ca, Sr, Ba, Ti, V, Cr, Fe, Cu, Al, and a combination thereof.

10 Claims, 5 Drawing Sheets

(51) Int. Cl.

| | | |
|---|---|---|
| *C01G 53/00* | (2006.01) | |
| *H01M 4/36* | (2006.01) | |
| *H01M 4/38* | (2006.01) | |
| *H01M 4/505* | (2010.01) | |
| *H01M 4/525* | (2010.01) | |
| *B82Y 30/00* | (2011.01) | |
| *H01M 4/485* | (2010.01) | |
| *H01M 4/04* | (2006.01) | |
| *H01M 4/02* | (2006.01) | |
| *H01M 4/133* | (2010.01) | |
| *H01M 4/134* | (2010.01) | |

(52) U.S. Cl.
CPC ........... *H01M 4/0471* (2013.01); *H01M 4/131* (2013.01); *H01M 4/366* (2013.01); *H01M 4/386* (2013.01); *H01M 4/485* (2013.01); *H01M 4/505* (2013.01); *H01M 4/525* (2013.01); *C01P 2002/50* (2013.01); *C01P 2004/03* (2013.01); *C01P 2004/62* (2013.01); *C01P 2004/64* (2013.01); *C01P 2004/84* (2013.01); *H01M 4/0404* (2013.01); *H01M 4/0407* (2013.01); *H01M 4/133* (2013.01); *H01M 4/134* (2013.01); *H01M 2004/028* (2013.01); *H01M 2220/30* (2013.01); *Y02E 60/122* (2013.01); *Y02P 70/54* (2015.11)

(58) Field of Classification Search
USPC ......................................................... 429/220
See application file for complete search history.

(56) References Cited

U.S. PATENT DOCUMENTS

| | | |
|---|---|---|
| 2005/0069758 A1 | 3/2005 | Kitao et al. |
| 2007/0224506 A1 | 9/2007 | Ooyama et al. |
| 2011/0031437 A1 | 2/2011 | Nagase et al. |
| 2012/0015248 A1 | 1/2012 | Park et al. |
| 2012/0295155 A1 | 11/2012 | Deng et al. |
| 2012/0301786 A1* | 11/2012 | Takamuku .......... B60L 11/1879 429/223 |

FOREIGN PATENT DOCUMENTS

| | | |
|---|---|---|
| JP | 2009-4310 A | 1/2009 |
| KR | 10-1999-0048468 A | 7/1999 |
| KR | 10-2001-0002212 A | 1/2001 |
| KR | 10-2010-0133421 A | 12/2010 |

OTHER PUBLICATIONS

KIPO Office Action dated Aug. 19, 2016, for corresponding Korean Patent Application No. 10-2013-0033854 (8 pages).

* cited by examiner

METHOD FOR PREPARING POSITIVE ACTIVE MATERIAL FOR RECHARGEABLE LITHIUM BATTERY AND RECHARGEABLE LITHIUM BATTERY INCLUDING POSITIVE ACTIVE MATERIAL

CROSS-REFERENCE TO RELATED APPLICATION

This application claims priority to and the benefit of Korean Patent Application No. 10-2013-0033854 filed in the Korean Intellectual Property Office on Mar. 28, 2013, the entire contents of which are incorporated herein by reference.

BACKGROUND

1. Field

A positive active material in a rechargeable lithium battery and a method for preparing the positive active material are disclosed.

2. Description of the Related Art

As the size and weight of portable electronic equipment have become smaller, there is a greater interest in developing batteries having higher performance and larger capacity for use in such portable electronic equipment.

Batteries generate electric power using an electrochemical reaction material (referred to hereinafter as the "active material") for each of a positive electrode and a negative electrode. Rechargeable lithium batteries generate electrical energy from changes in chemical potential during the intercalation/deintercalation of lithium ions at the positive and negative electrodes.

Rechargeable lithium batteries use materials that reversibly intercalate or deintercalate lithium ions during charge and discharge reactions for both positive and negative active materials, and include an organic electrolyte or a polymer electrolyte between the positive electrode and the negative electrode.

For positive active materials of a rechargeable lithium battery, lithium composite metal compounds have been used, and lithium composite metal oxides such as, for example, $LiCoO_2$, $LiMn_2O_4$, $LiNiO_2$, $LiNi_{1-x}Co_xO_2$ (0<x<1), $LiMnO_2$, $LiNi_{1-x-y}Co_xMn_yO_2$ (0<x<1, 1<y<1) or the like have also been considered.

SUMMARY

An aspect of an embodiment of the present invention is directed toward a rechargeable lithium battery including a positive active material being for improving capacity and cycle-life characteristics.

An aspect of an embodiment of the present invention is directed toward a method for manufacturing the positive active material.

In an aspect of an embodiment of the present invention, a rechargeable lithium battery includes a non-aqueous electrolyte, a negative electrode including a silicon-based negative active material, and a positive active material including a compound represented by a Chemical Formula 1, $Li_{1+x}Co_{1-y}M_yO_2$, wherein, $-0.2 \leq x \leq 0.2$, $0 < y \leq 0.2$, and M includes Ni and one selected from Mn, B, Mg, Ca, Sr, Ba, Ti, V, Cr, Fe, Cu, Al, and a combination thereof.

M may include Ni and Mn.

The rechargeable lithium battery may include a mole ratio of the Ni to Mn in a range of about 9:0.1 to about 9:2.

M may include one selected from Mg, Ti, and a combination thereof.

A charge and discharge efficiency of the rechargeable lithium battery may be in a range of about 86% to about 93%.

The silicon-based negative active material may be at least one selected from silicon (Si), silicon oxide, silicon oxide coated with a conductive carbon at a surface of the silicon oxide, and silicon (Si) coated with a conductive carbon at a surface of the silicon (Si).

In an aspect of an embodiment of the present invention, a method for manufacturing a positive active material for a rechargeable lithium battery is described, the method including mixing a solid-phase Li raw material, a solid-phase Co raw material, and a solid-phase M raw material to provide a mixture, wherein a mole ratio of the solid-phase Co raw material to the solid-phase M raw material may be controlled in order to obtain a mole ratio of Co:M of greater than or equal to about 0.8 and less than about 1:greater than about 0 and less than or equal to about 0.2, wherein the method further includes primarily heat-treating the mixture, pulverizing the primarily heat-treated mixture, and secondarily heat-treating the pulverized material, wherein M comprises Ni and one selected from: Mn, B, Mg, Ca, Sr, Ba, Ti, V, Cr, Fe, Cu, Al, or a combination thereof.

The solid-phase M raw material may include Ni and Mn.

The method may include mixing a raw metal material selected from B, Mg, Ca, Sr, Ba, Ti, V, Cr, Fe, Cu, Al, and a combination thereof to provide the mixture, wherein a mole ratio of the solid-phase Co to the sum of the M raw materials and + the raw metal material may be controlled in order to a mole ratio of Co to the sum of M and raw metal of greater than or equal to about 0.8 and less than about 1:greater than about 0 and less than or equal to about 0.2.

The method may include forming a coating layer comprising Ni, Mn, Co, or a combination thereof, utilizing a dry or wet process, wherein the secondarily heat-treating may be performed after pulverizing the primarily heat-treated mixture and the forming the coating layer.

The primarily heat-treating may be performed at a temperature in a range of about 950° C. to about 1100° C.

The secondarily heat-treating may be performed at a temperature in a range of about 900° C. to about 1050° C.

A rechargeable lithium battery according to an aspect of an embodiment of the present invention has high capacity, high cycle-life, and excellent stability, and thus, high power and high-capacity.

DETAILED DESCRIPTION

Example embodiments will be described hereinafter, in the detailed description. However, these embodiments are merely examples, and this disclosure is not limited thereto.

According to one embodiment of the present invention, a rechargeable lithium battery includes a positive active material including a compound represented by Chemical Formula 1 shown below; a negative electrode including a silicon-based negative active material; and a non-aqueous electrolyte.

Chemical Formula 1:

In the above Chemical Formula 1,
−0.2≤x≤0.2,
0<y≤0.2, and
M (metal M) includes Ni; and one selected from Mn, B, Mg, Ca, Sr, Ba, Ti, V, Cr, Fe, Cu, Al, and a combination thereof.

According to an embodiment of the present invention, the compound of Chemical Formula 1 included in the positive active material includes a metal such as, for example, Co and M. The metal M may be included in an amount equal to or less than about 20 mol %. The compound including the composition is used as a positive active material and may improve electrochemical characteristics of a rechargeable lithium battery. In one embodiment, the rechargeable lithium battery has high capacity, high cycle-life and high stability, and thus, high power and high-capacity.

In one embodiment, M in the above Chemical Formula 1 includes Ni and Mn. The Ni and Mn may have a mole ratio ranging from about 9:0.1 to about 9:2. The mole ratio of the Ni and Mn may be adjusted to regulate the charge and discharge capacities of a rechargeable lithium battery. According to an embodiment, the compound including the Ni and Mn within the range is used as a positive active material to improve capacity and cycle-life of a rechargeable lithium battery.

In one embodiment, the M in Chemical Formula 1 includes the Ni and Mn, and further includes Mg, Ti, or a combination thereof.

When the compound of Chemical Formula 1 is included in a positive active material, the positive active material may increase about 86% to about 93% of the charge and discharge efficiency of a rechargeable lithium battery.

According to another embodiment of the present invention, a method for manufacturing a positive active material for a rechargeable lithium battery is described. The described method includes preparing a mixture of a solid-phase Li raw material, a solid-phase Co raw material, and a solid-phase M raw material. The mole ratio of the solid-phase Co raw material to the M raw material is controlled in order to obtain a mole ratio of Co to M of greater than or equal to about 0.8 and less than about 1:greater than about 0 and less than or equal to about 0.2. The described method further includes heat-treating the mixture, pulverizing the heat-treated mixture and secondarily heat-treating the pulverized material, wherein the M includes Ni and one selected from Mn, B, Mg, Ca, Sr, Ba, Ti, V, Cr, Fe, Cu, Al, and a combination thereof.

The method for manufacturing a positive active material for a rechargeable lithium battery, according to an embodiment of the present invention is a dry synthesis method for preparing a compound including Co and M in a mole ratio of, greater than or equal to about 0.8 and less than about 1:greater than about 0 and less than or equal to about 0.2. Thus, the method may synthesize a compound represented by Chemical Formula 1.

In some embodiments of the present invention, at least one additional raw metal material selected from B, Mg, Ca, Sr, Ba, Ti, V, Cr, Fe, Cu, Al, and a combination thereof is added to the mixture. Accordingly, a compound represented by Chemical Formula 1 may include one selected from B, Mg, Ca, Sr, Ba, Ti, V, Cr, Fe, Cu, Al and a combination thereof.

According to an embodiment of the present invention, the solid-phase Co raw material and the sum of the solid-phase M raw material and the additional raw metal material may be controlled in order to have a mole ratio of Co and the sum of M and raw metal of greater than or equal to about 0.8 and less than about 1:greater than about 0 and less than or equal to about 0.2.

In some embodiments, the solid-phase Li raw material, includes lithium carbonate, lithium hydroxide, the like, or a mixture of more than two thereof.

In some embodiments, the solid-phase Co raw material, is cobalt oxide, cobalt hydrate, cobalt carbonate, the like or a mixture of more than two thereof.

In some embodiments, the solid-phase M raw material is prepared by general co-precipitation preparations. If each Ni raw material, Mn raw material, and Mg raw material, etc., are separately used as the solid-phase M raw material, rather than the solid-phase M raw material obtained from the co-precipitation preparation to fire (e.g., heat), a desirable phase is not formed.

In one embodiment, the solid-phase M raw material is a co-precipitate including Ni and Mn, for example, $Ni_zMn_{1-z}$ $(OH)_2$ (e.g., 0.8<z<0.99) to prepare a compound represented by Chemical Formula 1 and including Ni and Mn as the metal M.

Then, an additional raw metal material selected from B, Mg, Ca, Sr, Ba, Ti, V, Cr, Fe, Cu, Al, and a combination thereof is added to the mixture, thereby preparing a compound represented by Chemical Formula 1. The solid-phase Co raw material and the sum of the solid-phase M co-precipitation raw material and the additional raw metal material may be controlled to have a mole ratio of Co and the sum of M and raw material of, greater than or equal to about 0.8 and less than about 1:greater than about 0 and less than or equal to about 0.2.

In some embodiments, the primarily heat-treated product is secondarily heat-treated.

According to an embodiment of the present invention, a solid-phase mixture obtained by mixing raw materials, for example, a mixture in a powder state, is primarily heat-treated. The primarily heat-treating may be performed at a temperature ranging from about 950° C. to about 1100° C. for about 5 hours to about 10 hours.

According to an embodiment, the mixture is primarily heat-treated and then, pulverized. The pulverizing may be performed by disk-milling or roll-milling and then air jet-milling. The pulverized particles are secondarily heat-treated. In some embodiments, before secondarily heat-treating, a post-treatment may be performed after the primarily heat-treating, and then, a coating layer including Ni, Mn, and Co may be formed to prevent or reduce the electrochemical characteristic improvement effects of a rechargeable lithium battery from decreasing due to irregularly pulverized particles. The post-treatment may be performed by uniformly pulverizing with an air-jet mill. The secondarily heat-treating may be performed at a temperature in a range from about 900° C. to about 1050° C. for about 5 hours to about 10 hours.

According to an embodiment of the present invention, the coating process is performed using a wet or dry coating method. For example, the wet coating may be performed by using a coating solution prepared by dissolving each raw material respectively, including Ni and Mn, or Ni, Mn and Co in a solvent. The solvent may be alcohols such as methanol, ethanol, propanol, butanol, or a combination thereof. According to another example, the dry coating may be performed by physically mixing the pulverized particles with powder particles including Ni, Mn, and/or Co.

In some embodiments, the primarily heat-treated product is disk-milled, air jet-milled, and then is wet-coated with a $CoNO_3 \cdot 6H_2O$ solution (a predetermined amount of $CoNO_3 \cdot 6H_2O$+ethanol) and dried, and then, secondarily heat-treated. This coating is performed to lower the pH of the primarily heat-treated powder.

In some embodiments, in order to prevent changing the entire composition of the compound, the coating layer should not be too thick. For example, the coating solution for the wet coating may include a coating raw material in a concentration ranging from about 0.1 wt % to about 5 wt %.

In some embodiments, the powder particles (including Ni, Mn, Co, or a combination thereof) for the dry coating may have a particle diameter in a range from about tens of nanometers to less than or equal to about 1 μm.

The compound prepared according to an embodiment of the present invention, and represented by Chemical Formula 1 is used as a positive active material for a rechargeable lithium battery to manufacture a rechargeable lithium battery.

Rechargeable lithium batteries may be classified as lithium ion batteries, lithium ion polymer batteries, and lithium polymer batteries according to the presence of a separator and the kind of electrolyte used in the battery. The rechargeable lithium batteries may come in a variety of shapes and sizes, and include cylindrical, prismatic, coin-shape or pouch-shape batteries, and may also be bulk shape or be thin film batteries. Structures and manufacturing methods for lithium ion batteries are well known in the art and the details thereof are not provided.

Figure 1:
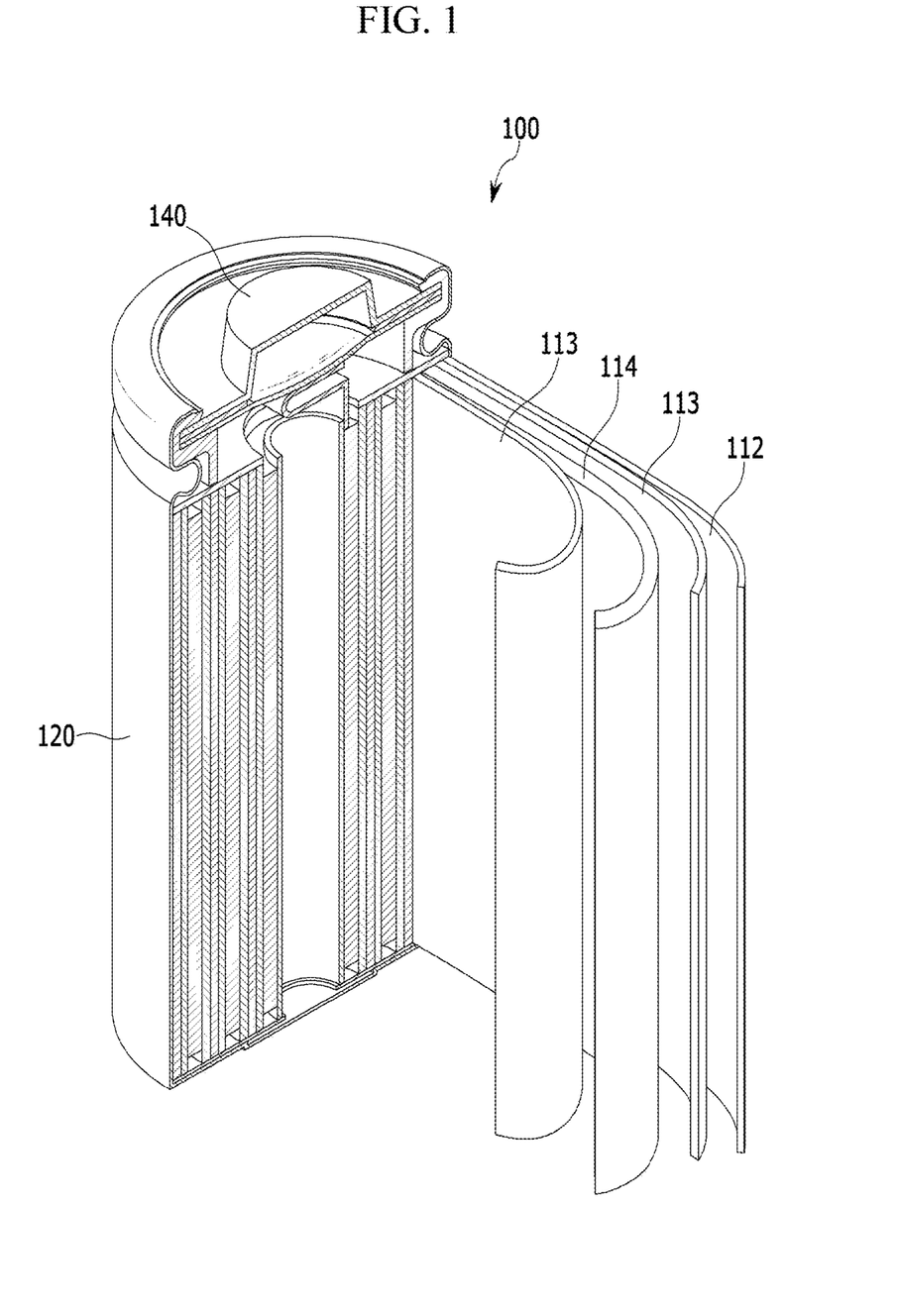
FIG. 1 is a schematic view showing the structure of a rechargeable lithium battery according to one embodiment of the present invention.

FIG. 1 is an exploded perspective view of a rechargeable lithium battery according to one embodiment of the present invention. The rechargeable lithium battery 100 is a cylindrical battery that includes a negative electrode 112, a positive electrode 114 and a separator 113 disposed between the negative electrode 112 and positive electrode 114, an electrolyte impregnated in the negative electrode 112, the positive electrode 114, and the separator 113, a battery case 120, and a sealing member 140 for sealing the battery case 120. The rechargeable lithium battery 100 may be manufactured by sequentially stacking and spirally wounding the negative electrode 112, the separator 113, and the positive electrode 114, and placing it in the battery case 120.

According to an embodiment of the present invention, the negative electrode includes a current collector and a negative active material layer formed on the current collector. The negative active material layer includes a silicon-based negative active material.

The silicon-based negative active material may include at least one selected from silicon (Si), silicon oxide, silicon oxide coated with a conductive carbon at a surface of the silicon oxide, and silicon (Si) coated with a conductive carbon at a surface of the silicon (Si).

The negative active material layer may further include a binder, and optionally, a conductive material.

In one embodiment, the binder improves the binding properties of the negative active material particles to each other and to a current collector. The binder may include, for example, polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but is not necessarily limited thereto.

According to an embodiment of the present invention, the conductive material improves electrical conductivity of a negative electrode. Any electrically conductive material may be used as a conductive agent unless it causes a chemical change. Examples of the conductive material include, but not necessarily be limited to, a carbon-based material made of natural graphite, artificial graphite, carbon black, acetylene black, ketjen black, a carbon fiber, and/or the like; a metal-based material made of a metal powder and/or a metal fiber including copper, nickel, aluminum, silver, and/or the like; a conductive polymer such as a polyphenylene; and a mixture thereof.

In some embodiments, the current collector is formed from a material selected from, a copper foil, a nickel foil, a stainless steel foil, a titanium foil, a nickel foam, a copper foam, a polymer substrate coated with a conductive metal, and combinations thereof.

According to an embodiment of the present disclosure, the positive electrode includes a current collector and a positive active material layer formed on the current collector. The positive active material layer includes a positive active material including a compound represented by Chemical Formula 1.

The positive active material layer also includes a binder and a conductive material.

According to an embodiment of the present invention, the binder improves binding properties of the positive active material particles to one another, and also with a current collector. Examples of the binder include at least one selected from polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not necessarily limited thereto.

According to an embodiment of the present disclosure, the conductive material is included to improve electrode conductivity. Any electrically conductive material may be used as a conductive material unless it causes a chemical change. Examples of the conductive material include one or more of natural graphite, artificial graphite, carbon black, acetylene black, ketjen black, a carbon fiber, a metal powder, or a metal fiber of copper, nickel, aluminum, silver, and the like, a conductive polymer such as a polyphenylene derivative.

In some embodiments, the current collector is Al, but the present invention is not necessarily limited thereto.

According to an embodiment of the present disclosure, the negative electrode and the positive electrode are manufactured by mixing a negative active material, a conductive material and a binder in a solvent to prepare an active material composition, and coating the composition on a current collector. The electrode manufacturing method is well known by persons skilled in the art, and thus is not described in more detail in the present specification. The solvent may include N-methylpyrrolidone, or the like, but is not necessarily limited thereto.

In some embodiments, the electrolyte includes a non-aqueous organic solvent and a lithium salt.

In some embodiments, the non-aqueous organic solvent plays a role of transferring ions that are related to an electrochemical reaction of a battery.

In some embodiments, the non-aqueous organic solvent includes carbonate-based, ester-based, ether-based, ketone-based, alcohol-based, and/or aprotic solvent. The carbonate-based solvent may include, but not necessarily be limited to, dimethyl carbonate (DMC), diethyl carbonate (DEC), dipropyl carbonate (DPC), methylpropyl carbonate(MPC), ethylpropyl carbonate (EPC), methylethyl carbonate (MEC), ethylene carbonate (EC), propylene carbonate (PC), butylene carbonate (BC), and the ester-based solvent may include methyl acetate, ethyl acetate, n-propyl acetate, dimethylacetate, methylpropionate, ethylpropionate, Ɣ-butyrolactone, decanolide, valerolactone, mevalonolactone, caprolactone, and/or the like. The ether-based solvent may include, but not necessarily be limited to, dibutyl ether, tetraglyme, diglyme, dimethoxyethane, 2-methyltetrahydrofuran, tetrahydrofuran, and/or the like, and the ketone-based solvent may include, but not necessarily be limited to, cyclohexanone, and/or the like. The alcohol-based solvent may include, but not necessarily be limited to, ethanol, isopropyl alcohol, and/or the like. The nonprotonic solvent may include, but not necessarily be limited to, R—CN (wherein R is a C2 to C20 linear, branched, or cyclic hydrocarbon group and may include, for example, a double bond, an aromatic ring, or an ether bond), amides such as dimethylformamide, dioxolanes such as 1,3-dioxolane, sulfolanes, and/or the like.

In some embodiments, the non-aqueous organic solvent is used singularly or in a mixture. When the organic solvent is used in a mixture, the mixture ratio may be controlled in accordance with a desirable battery performance, which is well-known by a person skilled in this art.

In some embodiments, the carbonate-based solvent includes a mixture of a cyclic carbonate and a linear carbonate. The cyclic carbonate and the linear carbonate are mixed together in a volume ratio of about 1:1 to about 1:9, and when the mixture is used as an electrolyte, the electrolyte performance may be enhanced.

The electrolyte of one embodiment may include mixtures of carbonate-based solvents and aromatic hydrocarbon-based solvents. The carbonate-based solvents and the aromatic hydrocarbon-based solvents are mixed together in a volume ratio of about 1:1 to about 30:1.

The aromatic hydrocarbon-based organic solvent may be represented by Chemical Formula 2.
Chemical Formula 2:

In Chemical Formula 2, $R_1$ to $R_6$ are each independently a hydrogen, a halogen, a C1 to C10 alkyl group, a C1 to C10 haloalkyl group, or a combination thereof.

The aromatic hydrocarbon based organic solvent may include, for example, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In some embodiments, the non-aqueous electrolyte may further include vinylene carbonate or an ethylene carbonate-based compound of Chemical Formula 3 to improve a battery cycle life.
Chemical Formula 3:

In Chemical Formula 3, $R_7$ and $R_8$ are each independently a hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

The ethylene carbonate-based compound includes, for example, difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the vinylene carbonate or the ethylene carbonate compound may be adjusted within an appropriate range for improving cycle-life.

According to an embodiment of the present invention, the lithium salt supplies lithium ions in the battery, and operates a basic operation of a rechargeable lithium battery and improves lithium ion transport between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bisoxalate borate, LiBOB). The lithium salt may be used at about 0.1M to about 2.0M concentration. When the lithium salt is included at the above concentration range, electrolyte performance and lithium ion mobility may be enhanced due to optimal electrolyte conductivity and viscosity.

According to an embodiment of the present disclosure, the separator 113 includes any material suitable for use in a lithium battery as long as it is able to separate the negative electrode 112 from the positive electrode 114, and provide a transporting passage for lithium ions. In other words, the separator 113 may be made of a material having a low resistance to ion transportation and an improved impregnation for an electrolyte. For example, the material may be, but not limited to, glass fiber, polyester, TEFLON (tetrafluoroethylene), polyethylene, polypropylene, polytetrafluoroethylene (PTFE), or a combination thereof. It may have a form of a non-woven fabric or a woven fabric. For example, a polyolefin-based polymer separator such as polyethylene, polypropylene or the like is mainly used for a lithium ion battery. In some embodiments, to ensure heat resistance or mechanical strength, a coated separator including a ceramic component and/or a polymer material is used. In some embodiments, the separator has a mono-layered or multi-layered structure.

Hereinafter, examples of the present invention and comparative examples are described. These examples, however, are not to be interpreted as limiting the scope of the invention.

SYNTHESIS EXAMPLE 1 y=0.10 in Chemical Formula 1

39.55 g of $Li_2CO_3$ powder, 73.64 g of $Co_3O_4$ powder, and 9.36 g of a $Ni_{0.95}Mn_{0.025}Mg_{0.025}(OH)_2$ powder were mixed and then, primarily fired or heated at 975° C. for 10 hours. The fired powder mixture was disk-milled and air jet-milled.

Then, 100 g of the synthesized powder was coated with 20 g of an ethanol solution prepared by dissolving 4.44 g of $NiNO_3.6H_2O$ and 3.83 g of $MnNO_3.4H_2O$ in 11.73 g of ethanol (4.44 g of $NiNO_3.6H_2O$ and 3.83 g of $MnNO_3.4H_2O+11.73$ g of ethanol). The coated powder was secondarily fired or heated at 900° C. for 10 hours, thus obtaining a $LiCo_{0.90}Ni_{0.095}Mn_{0.0025}Mg_{0.0025}O_2$ powder.

SYNTHESIS EXAMPLE 2 y=0.15 in Chemical Formula 1

39.57 g of $Li_2CO_3$ powder, 69.60 g of $Co_3O_4$ powder, and 14.06 g of $Ni_{0.95}Mn_{0.025}Mg_{0.025}(OH)_2$ powder were mixed and then, primarily fired or heated at 975° C. for 10 hours. The fired powder was disk-milled and then, air jet-milled.

100 g of the synthesized powder was coated with 20 g of an ethanol solution prepared by dissolving 4.44 g of $NiNO_3.6H_2O$ and 3.83 g of $MnNO_3.4H_2O$ in ethanol (4.44 g of $NiNO_3.6H_2O$ and 3.83 g of $MnNO_3.4H_2O+11.73$ g of ethanol). The coated powder was secondarily fired or heated at 900° C. for 10 hours, thus obtaining $LiCo_{0.85}Ni_{0.1425}Mn_{0.00375}Mg_{0.00375}O_2$ powder.

SYNTHESIS EXAMPLE 3 y=0.20 in Chemical Formula 1

39.60 g of $Li_2CO_3$ powder, 65.55 g of $Co_3O_4$ powder, and 18.75 g of $Ni_{0.95}Mn_{0.025}Mg_{0.025}(OH)_2$ powder were mixed and primarily fired or heated at 975° C. for 10 hours. The fired powder mixture was disk-milled and then, air-jet milled.

100 g of the synthesized powder was coated with a solution prepared by dissolving 4.44 g of $NiNO_3.6H_2O$ and 3.83 g of $MnNO_3.4H_2O$ in ethanol to prepare 20 g of a solution (4.44 g of $NiNO_3.6H_2O$ and 3.83 g of $MnNO_3.4H_2O+11.73$ g of ethanol). The coated powder was secondarily fired at 900° C. for 10 hours, thus obtaining $LiCo_{0.80}Ni_{0.19}Mn_{0.005}Mg_{0.005}O_2$ powder.

SYNTHESIS EXAMPLE 4 y=0.30 in Chemical Formula 1

39.52 g of $Li_2CO_3$ powder, 77.69 g of $Co_3O_4$ powder, and 4.68 g of $Ni_{0.95}Mn_{0.025}Mg_{0.025}(OH)_2$ powder were mixed and then, primarily fired or heated at 975° C. for 10 hours. The fired powder was disk-milled and then, air-jet milled.

100 g of the synthesized powder was coated with 20 g of an ethanol solution prepared by dissolving 4.44 g of $NiNO_3.6H_2O$ and 3.83 g of $MnNO_3.4H_2O$ (4.44 g of $NiNO_3.6H_2O$ and 3.83 g of $MnNO_3.4H_2O+11.73$ of ethanol). The coated powder was secondarily fired or heated at 900° C. for 10 hours, thus obtaining $LiCo_{0.70}Ni_{0.285}Mn_{0.0075}Mg_{0.0075}O_2$ powder.

SYNTHESIS EXAMPLE 5

Method of Generally Preparing LCO 39.64 g of $Li_2CO_3$ powder, 81.19 g of $Co_3O_4$ powder, and 0.41 g of MgO powder were primarily fired or heated at 1050° C. for 10 hours. The fired powder was disk-milled and then, air-jet milled.

100 g of the synthesized powder was coated with 20 g of an ethanol solution prepared by dissolving Al-isopropoxide in ethanol (0.39 g of Al isopropoxide+19.61 g of ethanol). The coated powder was secondarily fired or heated at 650° C. for 10 hours, thus obtaining LCO powder.

EXAMPLE 1

Manufacturing of a Coin Cell Using Positive Active Material According to Synthesis Example 1

The powder according to Synthesis Example 1 as a positive active material, polyvinylidene fluoride as a binder, and carbon black as a conductive material were mixed in a weight ratio of 90:5:5 in an N-methylpyrrolidone solvent, thus preparing a positive active material layer slurry. The positive active material layer slurry was coated on an Al foil as a positive electrode current collector, dried at about 120° C. for one hour, and compressed, thus manufacturing a positive electrode including a positive active material layer.

A negative electrode was manufactured by using a mixture of $SiO_x$ and graphite at a weight ratio of 3:97 as a negative active material.

The positive and negative electrodes were assembled with a 20 μm-thick polyethylene separator and an electrolyte solution prepared by mixing EC (ethylene carbonate), EMC (ethylmethyl carbonate), and DMC (dimethyl carbonate) in a volume ratio of 3:3:4, wherein the ratio corresponds to the ratio of, EM:EMC:DMC and adding 1.15M $LiPF_6$ to the mixture, thus manufacturing a coin cell.

EXAMPLE 2

Manufacturing of a Coin Cell Using Positive Active Material According to Synthesis Example 2

A coin cell was manufactured according to substantially the same method as Example 1, except for using the powder according to Synthesis Example 2 as the positive active material.

EXAMPLE 3

Manufacturing of a Coin Cell Using Positive Active Material According to Synthesis Example 3

A coin cell was manufactured according to substantially the same method as Example 1 except for using the powder according to Synthesis Example 3 as the positive active material.

EXAMPLE 4

Manufacturing of a Coin Cell Using Positive Active Material According to Synthesis Example 4

A coin cell was manufactured according to substantially the same method as Example 1 except for using the powder according to Synthesis Example 4 as the positive active material.

COMPARATIVE EXAMPLE 1

Manufacturing of a Coin Cell Using Positive Active Material According to Synthesis Example 5

A coin cell was manufactured according to substantially the same method as Example 1 except for using the powder according to Synthesis Example 5 as the positive active material.

The following Table 1 shows a charge and discharge efficiency data of the coin cells for Examples 1 to 4 and Comparative Example 1.

Figure 2:
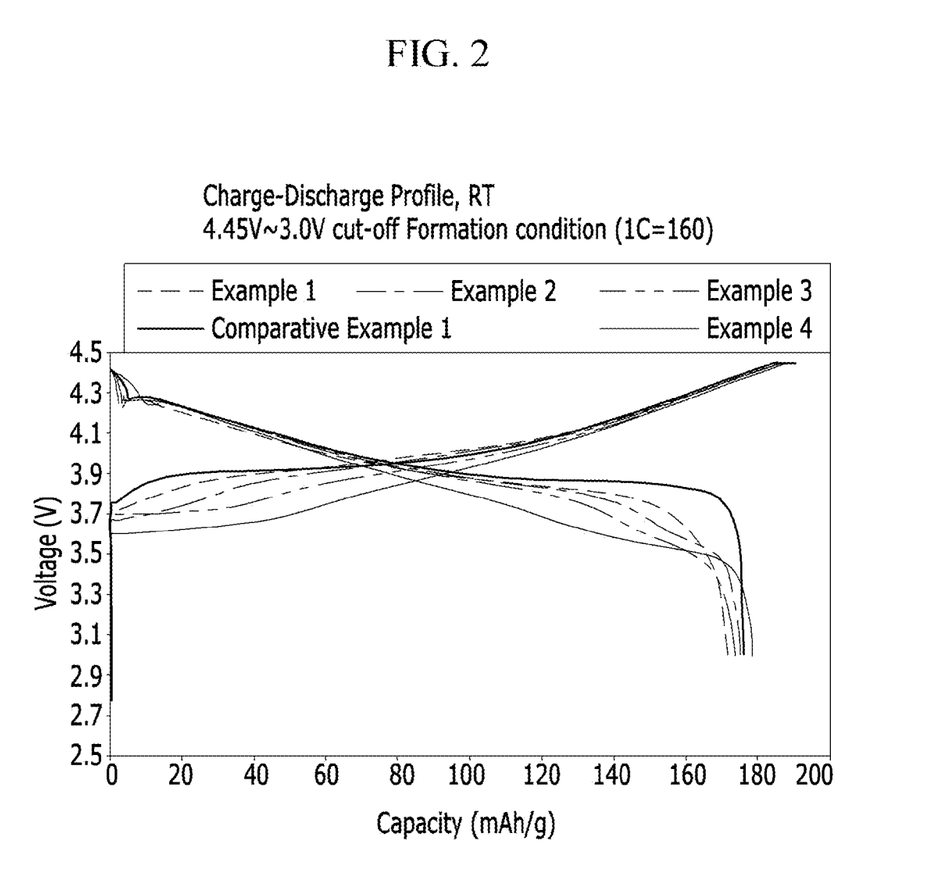
FIG. 2 is an initial charge and discharge graph showing rechargeable lithium battery cells according to Examples 1 to 4 and Comparative Example 1.

FIG. 2 is the initial charge and discharge graph of the coin cells according to Examples 1 to 4 and Comparative Example 1.

TABLE 1

| | 0.2 C CCV-0.2 C CC (4.45 V-3.0 V) | | |
|---|---|---|---|
| | Charge (mAh/g) | Discharge (mAh/g) | Efficiency (%) |
| Comparative Example 1 | 187.03 | 175.85 | 94.02 |
| Example 1 | 188.89 | 171.57 | 90.83 |
| Example 2 | 189.28 | 174.96 | 92.44 |
| Example 3 | 191.31 | 174.23 | 91.07 |
| Example 4 | 190.28 | 178.27 | 93.69 |

As shown in Table 1 and FIG. 2, the coin cells according to Examples 1 to 4 have excellent battery characteristics.

Figure 3:
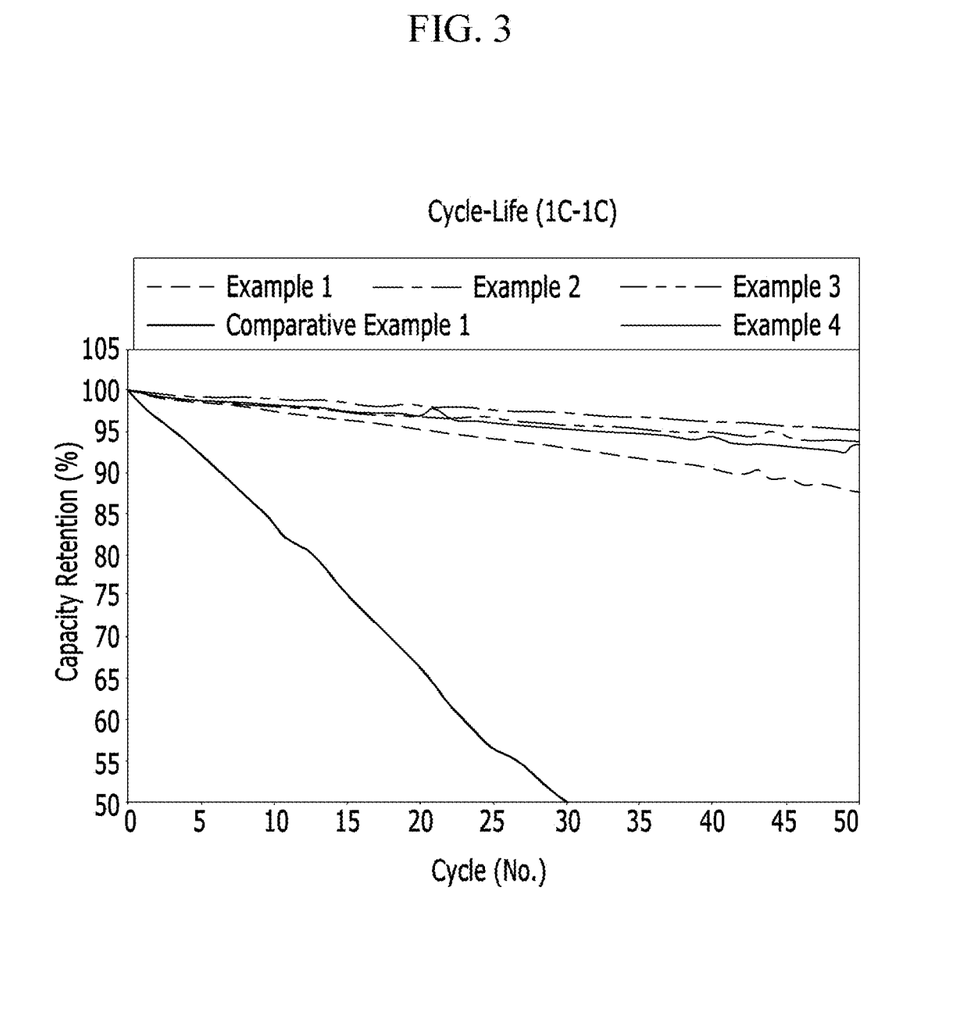
FIG. 3 is cycle-life characteristic data of the rechargeable lithium battery cells according to Examples 1 to 4 and Comparative Example 1.

FIG. 3 provides cycle-life characteristic data of the coin cells according to Examples 1 to 4 and Comparative Example 1. The cycle-life characteristics tests were performed by charging the coin cells at 1C and discharging the coin cells at 1C for 100 times.

As shown in FIG. 3, the battery cells according to the example embodiments of the present invention have improved cycle-life characteristic.

Figure 4A:
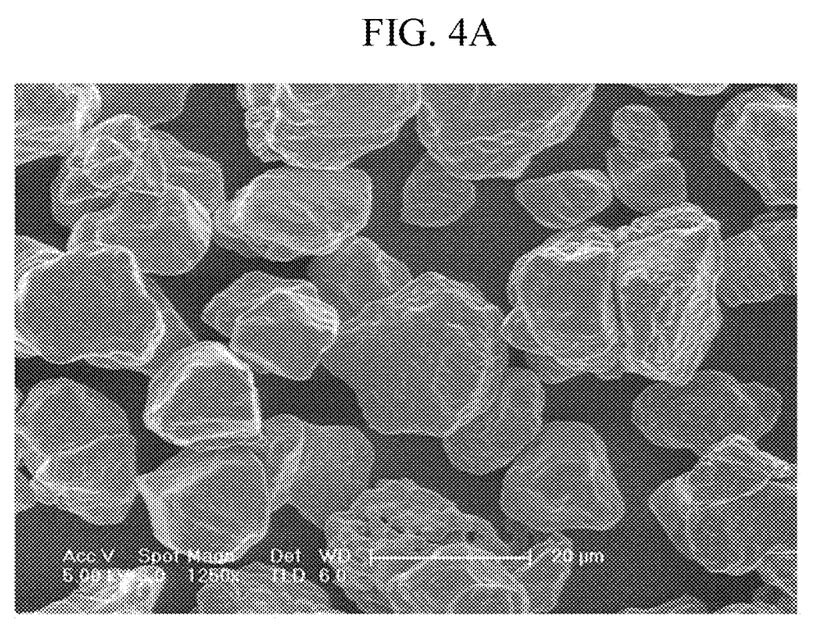
FIGS. 4A and 4B are SEM photographs of a positive active material according to Synthesis Example 2.
Figure 4B:
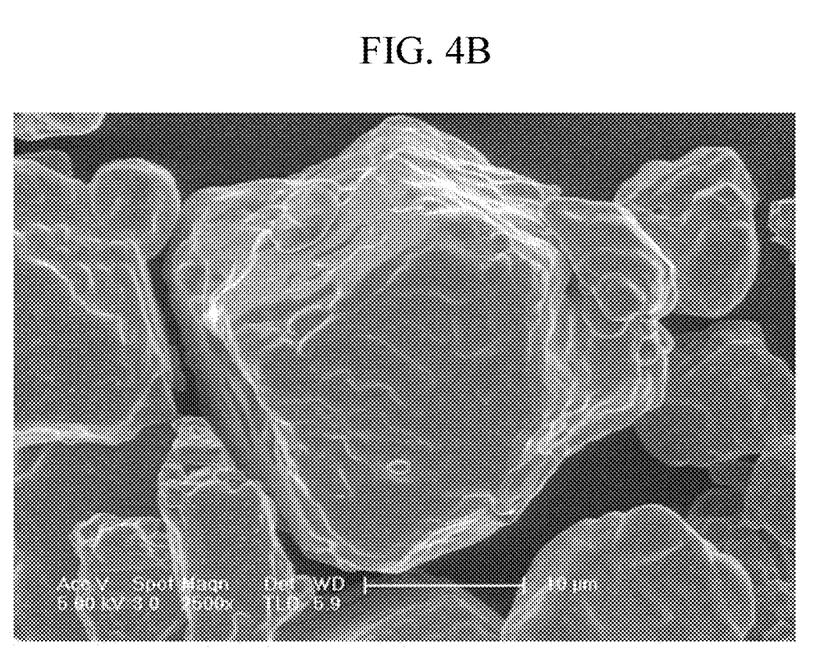

FIGS. 4A and 4B are SEM photographs of the positive active material according to Synthesis Example 2. The positive active material had a uniform particle diameter.

While this disclosure has been described in connection with example embodiments, it is to be understood that the embodiments of the present invention are not limited to the disclosed embodiments, but, are intended to cover various modifications and equivalent arrangements included within the spirit and scope of the appended claims and their equivalents.

What is claimed is:

1. A rechargeable lithium battery, comprising:
a non-aqueous electrolyte;
a negative electrode comprising a silicon-based negative active material; and
a positive active material comprising a compound represented by a following Chemical Formula 1, $$Li_{1+x}Co_{1-y}M_yO_2 \quad \text{[Chemical Formula 1]}$$

wherein,
−0.2≤x≤0.2,
0<y≤0.2,
M comprises Ni and Mn,
wherein a mole ratio of the Ni to Mn is in a range of about 9:0.1 to about 9:2.

2. The rechargeable lithium battery of claim 1, wherein M further comprises one selected from: Mg, Ti, and a combination thereof.

3. The rechargeable lithium battery of claim 1, wherein a charge and discharge efficiency of the rechargeable lithium battery is in a range of about 86% to about 93%.

4. The rechargeable lithium battery of claim 1, wherein the silicon-based negative active material is at least one selected from: silicon (Si), silicon oxide, silicon oxide coated with a conductive carbon at a surface of the silicon oxide, and silicon (Si) coated with a conductive carbon at a surface of the silicon (Si).

5. A method for manufacturing a positive active material for a rechargeable lithium battery, the method comprising:
mixing a solid-phase Li raw material, a solid-phase Co raw material, and a solid-phase M raw material to provide a mixture, wherein a mole ratio of the solid-phase Co raw material to the solid-phase M raw material is controlled in order to obtain a mole ratio of Co to M of greater than or equal to about 0.8 and less than or about 1:greater than about 0 and less than or equal to about 0.2;
primarily heat-treating the mixture;
pulverizing the primarily heat-treated mixture; and
secondarily heat-treating the pulverized material,
wherein M comprises Ni and Mn,
wherein a mole ratio of the Ni to Mn is in a range of about 9:0.1 to about 9:2.

6. The method of claim 5, further comprising mixing a raw metal material selected from B, Mg, Ca, Sr, Ba, Ti, V, Cr, Fe, Cu, Al, and a combination thereof to provide the mixture, wherein
a mole ratio of the solid-phase Co to the sum of M raw materials and the raw metal material is controlled in order to obtain a mole ratio of Co to the sum of M and the raw metal of greater than or equal to about 0.8 and less than about 1:greater than about 0 and less than or equal to about 0.2.

7. The method of claim 5, further comprising forming a coating layer comprising Ni, Mn, Co, or a combination thereof, utilizing a dry or wet process, wherein the secondarily heat-treating is performed after pulverizing the primarily heat-treated mixture and the forming the coating layer.

8. The method of claim 5, wherein the primarily heat-treating is performed at a temperature in a range of about 950° C. to about 1100° C.

9. The method of claim 5, wherein the secondarily heat-treating is performed at a temperature in a range of about 900° C. to about 1050° C.

10. An electronic device comprising an electronic circuit powered by the rechargeable lithium battery of claim 1.

* * * * *